United States Patent
Veazey

[15] 3,662,560
[45] May 16, 1972

[54] VALVE GUARD AND BURYING METHOD AND APPARATUS

[72] Inventor: Anthony H. Veazey, Belle Chasse, La.

[73] Assignee: Brown & Root, Inc., Houston, Tex.

[22] Filed: Apr. 3, 1970

[21] Appl. No.: 25,367

[52] U.S. Cl. ............................................61/72.4, 138/110
[51] Int. Cl. ........................................F16l 1/00, E02f 5/02
[58] Field of Search ..................61/72.4, 72.1, 72.3, 33.74, 61/63; 138/110, 103

[56] References Cited

UNITED STATES PATENTS

| | | | |
|---|---|---|---|
| 3,505,826 | 4/1970 | Harmstorf | 61/72.4 |
| 2,871,667 | 2/1959 | Nedderman | 61/53.74 |
| 2,602,300 | 7/1952 | Collins | 61/72.4 |

OTHER PUBLICATIONS

The Oil and Gas Journal, (pub.) of Aug. 18, 1969, p. 52

Primary Examiner—Jacob Shapiro
Attorney—Burns, Doane, Benedict, Swecker & Mathis

[57] ABSTRACT

A method and apparatus for burying an underwater pipeline section and a generally perpendicularly disposed tap-off valve into the bed of the body of water. A tubular bridge member is constructed over the tap-off valve and the valve is surrounded with a generally rectangular high pressure fluid manifold having a plurality of downwardly disposed nozzles positioned along the lateral sides thereof. The burying operation is accomplished by connecting a high pressure fluid line to the manifold and jetting away the bed surrounding the pipeline section and valve to enable the structure to descent within the waterbed.

8 Claims, 7 Drawing Figures

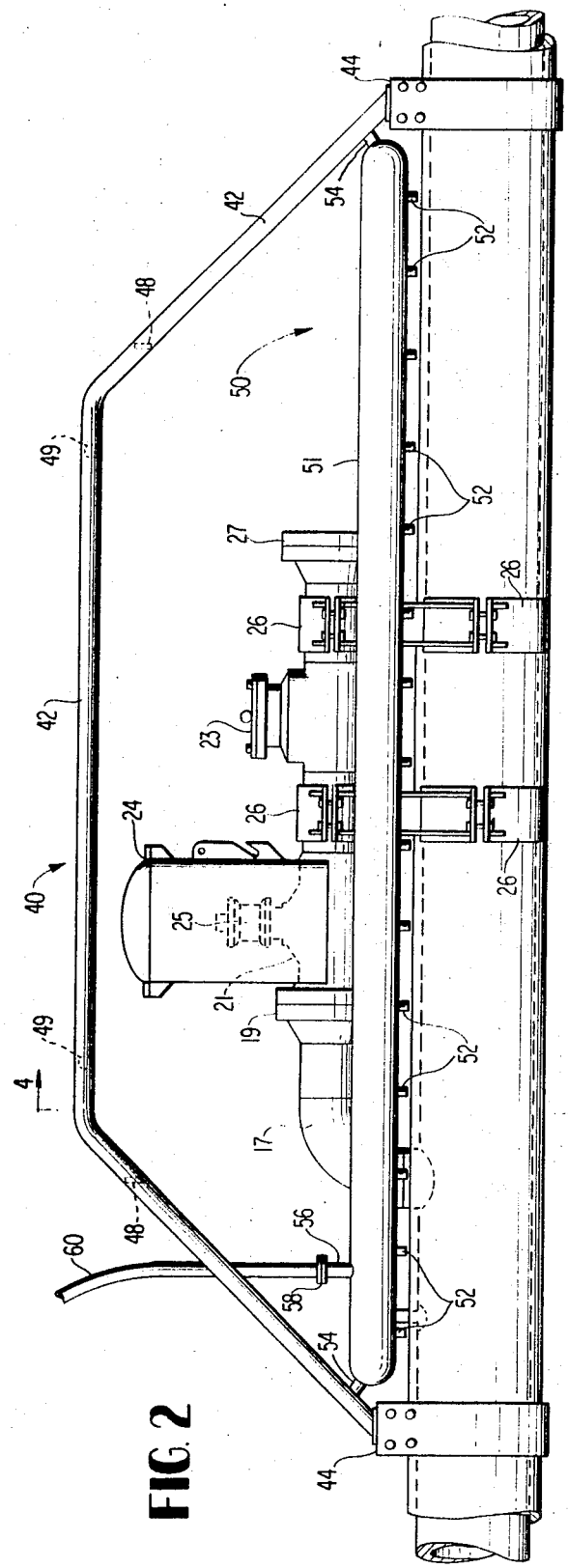
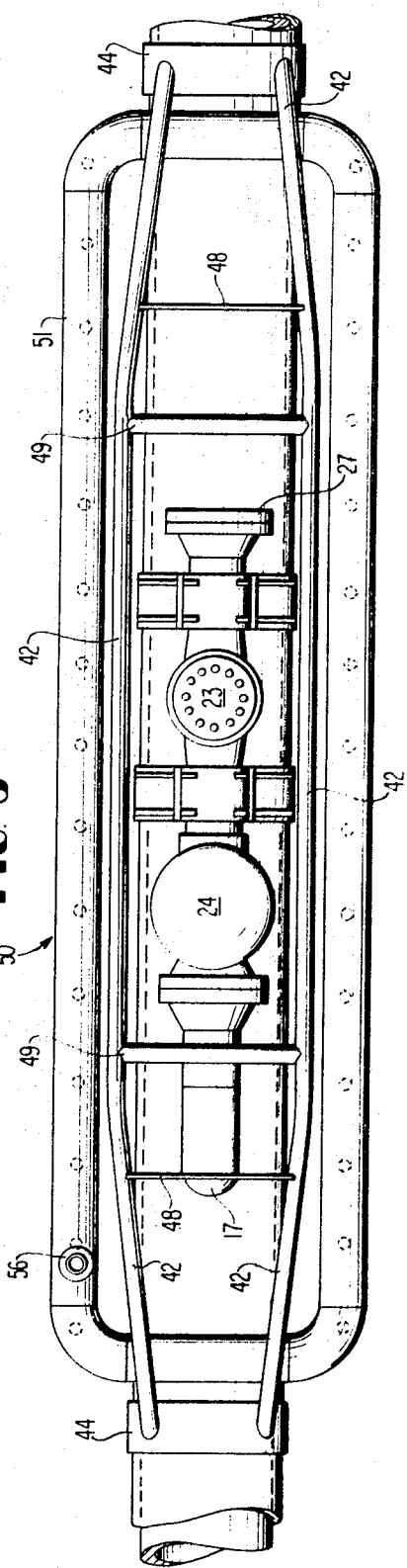
FIG. 2
FIG. 3

INVENTOR
ANTHONY H VEAZEY

BY Burns, Doane, Benedict, Swecker & Mathis

ATTORNEYS

VALVE GUARD AND BURYING METHOD AND APPARATUS

BACKGROUND OF THE INVENTION

This invention relates to protecting and burying a pipeline section and valve within a bed which supports the pipeline and valve structure. More particularly, the invention relates to a method and apparatus for protecting and burying a pipeline section and a valve connected thereto within a bed lying beneath a body of water.

Pipelines have in the past been laid across rivers, lakes, ship channels and into the sea or ocean, for a variety of reasons but particularly for the purpose of transporting minerals mined from beneath a body of water to a transfer station on or near a shore location. These subsea pipelines are continuously subject to environmental breakdown, such as for example, by oxidation and attach by marine life. Further, subsea pipelines are subject to damage from trolling operations and the like as well as being subject to stresses and possible displacement by strong underwater currents. To minimize pipeline degradation and damage of the above mentioned type, it has been the practice in the past to both coat the pipeline and bury it within the seabed.

In this connection various devices have been previously utilized to bury a pipeline within a waterbed, such as, for example, plows, auger trenching devices and jet burying systems. An example of this type of apparatus is disclosed in a Hauber et al. U.S. Pat. No. 2,755,632, assigned to the assignee of this application.

While previously known pipeline burying devices and techniques are advantageous and have been utilized with a high degree of success in burying unobstructed lengths of subsea pipelines, often it is desirable to provide a main underwater pipeline with tap-off capability in a plurality of locations along the length thereof. Thus fluid flowing within the pipeline may be diverted into a smaller line for delivery to a tanker or transportation to a branch location remote from the main line. In these instances, at desired intervals, a secondary line is tapped generally normally into the main conduit. In many instances the secondary line may be provided with various flow regulation and control devices such as for example valves and/or meters.

When it is desired to bury the pipeline, however, a problem is encountered at this tap-off junction. In this connection, as the burying device, such as for example the previously mentioned Hauber et al. apparatus proceeds along the pipeline, it often runs into the valve, thus damaging it. In those instances where the valve is detected in time to avoid contact with the burying sled, the "stinger" has to be raised and transported around or over the valve structure and restarted beyond the valve section of the pipeline. Therefore, the valve section may remain improperly or not fully buried and consequently is subject to being hooked by a trolling line or anchor, as previously discussed in connection with the pipeline in general.

It would be desirable, therefore, to protect the tap-off valve from damage and conveniently bury the limited pipe section containing the tap-off valve along with the overall pipeline burying process.

In the past, at least one method for accomplishing the supplemental burying operation has been to dispatch a number of divers to the valve structure with a plurality of high pressure fluid hoses. The seabed is then jetted away essentially by a hand operation.

Disadvantages of this means of burying the pipeline section, such as limited vision of the divers in the agitated murky water, cost and time consumed in this phase of the burying operation and the dangers involved in manipulating high pressure fluid lines by divers whose vision is obstructed are believed to be self-evident. In this connection burying a valve section by hand requires 10 to 12 man-hours.

Further, jetting with a plurality of fluid hoses may promote an uneven formation of the jetted bed thus potentially creating an excessive stress on the pipeline as the jetting operation proceeds.

It would therefore also be highly desirable to provide a method and apparatus for burying a valve section of a pipeline in a uniform manner, preferably from a remote location wherein the operations performed by divers are minimized

SUMMARY AND OBJECTS OF THE INVENTION

OBJECTS OF THE INVENTION

To this and other ends it is therefore a general object of the invention to provide a method and apparatus for burying a tap-off valve pipeline section which will obviate or minimize problems and disadvantages of the type previously mentioned.

It is a particular object of the invention to provide a method and apparatus to protect and bury a valve and pipeline section within the bed which supports the section.

It is another object of the invention to provide a method and apparatus to protect and bury a valve and pipeline section within a bed positioned beneath a body of water.

It is a further object of the invention to provide a method and apparatus to minimize the costs and dangers of burying a valve and pipeline section into a bed beneath a body of water.

It is a still further object of the invention to provide a method and apparatus for simultaneously and uniformly burying a valve and pipeline section within the bed of a body of water.

BRIEF SUMMARY

One preferred form of the invention intended to accomplish at least some of the foregoing objects comprises a tubular bridge member positioned over the pipeline valve structure to isolate the valve from objects and trenching devices which may inadvertently bump against the normally projecting structure. The valve and pipeline sections are surrounded with a high pressure jetting manifold containing a plurality of jetting nozzles suitable for simultaneously directing a plurality of jets downward into the bed upon which the pipeline and valve section rests to flush away the bed and permit the section to be buried therein.

A significant method aspect of the invention comprises translating a burying device along an underwater pipeline; transporting the burying device to bypass a tap-off valve section connected with the pipeline; connecting a high pressure fluid line to a uniform jetting member surrounding the valve; jetting away the seabed contiguous with the tap-off valve pipeline section and continuing to translate the burying device along the underwater pipeline.

THE DRAWINGS

Further objects and advantages of the invention will become apparent from the following detailed description taken in conjunction with the accompanying drawings, wherein:

FIG. 2 is a side elevational view of FIG. 1, showing a preferred embodiment of the invention and a relative position of the jetting manifold with respect to the valve structure and pipeline;

FIG. 3 is a plan view of the valve protective and burying apparatus shown in FIG. 2;

FIG. 4 is a sectional view of the valve protective and burying device taken along section line 4—4 in FIG. 2.

DESCRIPTION OF THE PREFERRED EMBODIMENT

VALVE GUARD AND BURYING APPARATUS

Figure 1:
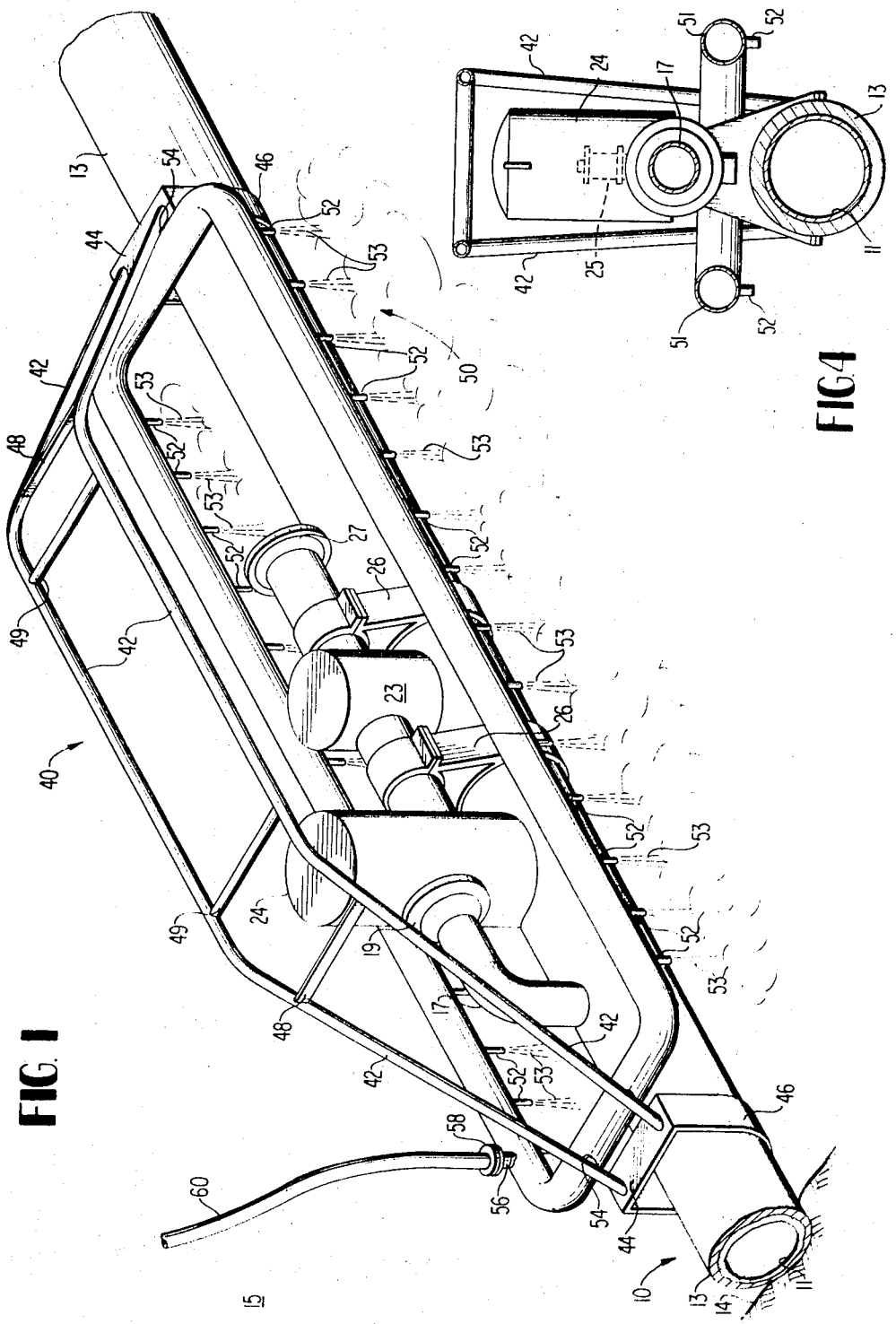
FIG. 1 is an isometric view of a valve protective and burying apparatus comprising an illustrative embodiment of the invention.

Referring now to the drawings, wherein like numerals designate like parts, and more specifically to FIG. 1 therein, there is disclosed a tubular conduit or pipeline 10 comprising an inner metal conduit 11 and an outer coating 13 of bituminous or cementitious material which serves to structurally reinforce and protect the inner conduit from oxidation and degradation by marine growths and also serves to add weight to the pipeline and thus minimize buoyancy problems. The pipeline is positioned upon the bed 14 of a body of water 15 such as the sea or ocean which may range in depth from a few feet to several hundred feet in depth.

Referring to FIGS. 1-4, there will be seen an elbow conduit 17 connecting normally at one end thereof into the pipeline 10 and extending at the other end thereof in a posture approximately axially parallel to the conduit 10. Connected axially to the elbow 17 by means of a flange joint 19 is a valve 21 and serially connected downstream thereof is a filter 23. The valve 21 is provided with a removable cover 24 which serves to insulate the valve actuation stem 25 from debris which may obstruct the operation thereof or ease with which an actuation tool may be connected thereto. The valve 21 and filter 23 are secured to the conduit 10 by means of conventional double saddle braces 26.

Extending downstream of the filter 23 is a flange joint 27 suitable for connection with a branch conduit (not shown), which would lead to a tanker or a remote transfer station.

Positioned above the valve and filter structure is a generally tubular shield or guard 40. The guard 40 comprises a pair of generally inverted U-shaped bar members 42 which may be secured at their ends to a plate 44 as by welding or other conventional connecting means. The plate 44 in turn is attached to the conduit 10 by means of a saddle strap 46 which is connected to the plate 44 by welding, by threaded fasteners or other conventional means. The guard bars 42 are maintained in a generally parallel posture by a plurality of spacer strips 48 and tie rods 49. The guard 40 thus positioned serves to protect the valve structure from potentially damaging contact with burying apparatus, trolling equipment or the like.

Connected to the valve guard 40 in a posture surrounding the valve mechanism is a generally rectangular manifold 50. The manifold is formed from a closed loop tubular conduit 51 and is provided with a plurality of downwardly extending tubes or nozzles 52 along the lateral or long sides thereof. The nozzles 52 are suitable to simultaneously entrain a plurality of high pressure jet streams 53 into the bed 14 upon which the pipeline is resting as schematically illustrated in FIG. 1.

The generally rectangular burying manifold 50 may be connected to the valve guard 40 by means of a plurality of channel sections 54 which may be welded to the manifold and guard structure or otherwise conventionally connected or united thereto.

Figure 6:
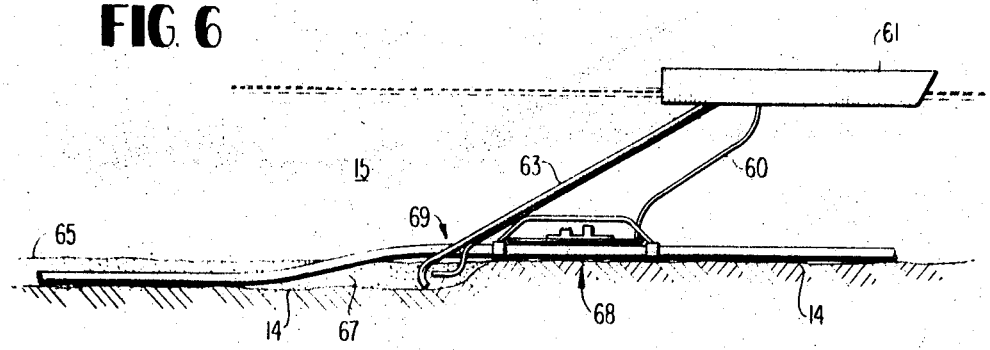

A tap conduit 56 is connected into a section of the high pressure manifold 50 and is provided with a flange joint 58 for ready connection to a high pressure fluid conduit 60 which is extended into the water from a burying barge 61 (note FIG. 6).

THE METHOD

Figure 5:
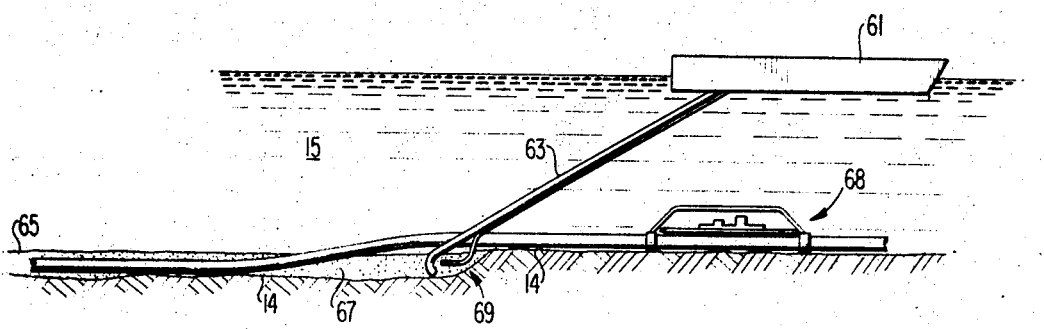
FIGS. 5, 6 and 7 schematically represent the steps in burying a pipeline and valve section by a preferred method of the invention.
Figure 7:
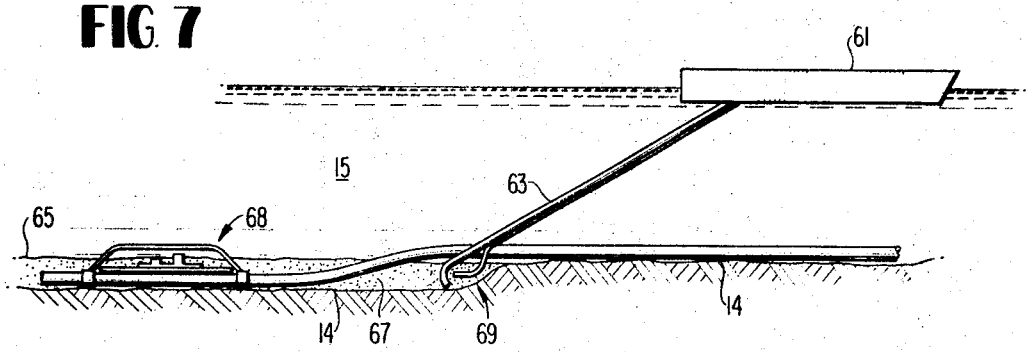

Referring now to FIGS. 5-7, a preferred method of burying the pipeline including a tap-off valve section is generally sequentially shown.

More particularly it will be seen in FIG. 5 that a burying barge 61 may be navigated along the general path of the conduit 10 pulling a burying "stinger" 63 along the pipeline to bury the pipeline within the bed 14 of a body of water 15. As the bed 14 upon which the conduit is disposed is flushed or jetted away by the burying stringer 63, the conduit descends below the normal mud line 65. Silt and mud 67 which has been flushed away accumulates over the descended conduit thus essentially protectively burying it within the subsea bed 14. For a more detailed description of the burying apparatus, reference may be had to the previously mentioned Hauber et al. U.S. Pat. No. 2,755,632 the disclosure of which is hereby incorporated by reference as though set forth at length.

When the burying apparatus reaches the tap-off valve structure or section 68 as best seen in FIG. 6 the stinger 63 may be lifted over or around the valve guard 40 and repositioned at a location downstream of the valve. In some instances, depending upon the structure of the burying head 69, the stinger 63 may actually cam up and ride over the bridge guard 40 which protects the valve structure. Thus the need to raise and lower the cumbersome stinger 63 with the attendant time consuming disadvantages of alignment is avoided. In this instance it will be appreciated that the guard serves in a dual role as a camming member and a guarding device.

Once the burying stinger 63 has either bypassed or ridden over the valve guard 40, a high pressure conduit 60 may be connected to the manifold tap conduit 56 and a high pressure fluid may be injected into the manifold 50 from the burying barge 61. It will be appreciated that simultaneous uniform jetting will be provided all along the lateral sides of the valve section with the introduction of high pressure fluid within the manifold as schematically illustrated in FIG. 1. The simultaneous jetting or flushing away of the subsea bed rapidly, 1 to 2 hours as compared with 10 to 12 hours for a hand operation, permits a uniform descent of the pipeline and valve section. Therefore substantial savings in time may be realized and the potential hazard of excessive bending stress previously encountered with uneven jetting techniques is minimized.

The tap-off valve section 68 thus buried, it will be seen in FIG. 7 that the high pressure line 60 may be disconnected and the guard 40 will be left intact protectively buried beneath a layer of mud and sediment 69. When it is desirable to tap-off from this section of the pipeline, a diver may reconnect a high pressure conduit 60 to the tap conduit 56 and a limited amount of high pressure fluid may be delivered to the jetting manifold to cleanse the valve and end flange structure from accumulated mud and silt disposed thereupon.

SUMMARY OF THE MAJOR ADVANTAGES

It will be appreciated by those skilled in the art that the above disclosed method and apparatus provides a means for protecting and burying a valve section of a subsea pipeline or the like which minimizes the dangers inherent in a manned diving operation. Further, the burying job may proceed at a uniformly rapid rate which minimizes stresses created in the pipeline by uneven jetting previously encountered in diving operations and may decrease the operation time by as much as a factor of 10.

The guard may in some instances serve as a suitable cam or guide for permitting conventional burying devices to ride over the valve structure and thus eliminate time spent picking up the burying device and realigning the unit with the conduit to be buried downstream of the valve section.

Further it will be realized that the jetting manifold provides a convenient means of reestablishing a mud free area for connection to a tap-off line at times subsequent to the burying operation.

Although the invention is described with reference to preferred embodiments, it will be appreciated by those skilled in the art that additions, deletions, modifications, substitutions and other changes not specifically described and illustrated in these embodiments, may be made which will fall within the purview of the invention.

What is claimed is:

1. A valve guard and burying device comprising:
   guard means connectable to a pipeline resting upon a bed for protecting a valve position on the pipeline;
   jetting means connected to said guard means for burying the pipeline and valve into the bed, said jetting means comprising,
   a closed loop manifold having a plurality of jetting apertures therein and connected to said guard means;
   said guard means comprising,
   bridging means connected to said jetting means and extending upwardly from and between opposed sides of said closed loop manifold for protective extension over a valve member projecting generally normally from the pipeline, and coupling means connected to and extending beneath opposite ends of said bridging means for fixedly securing said bridging means to the pipeline.

2. A valve guard and burying device as defined in claim 1 and further comprising:

a plurality of jetting nozzles connected to said plurality of jetting apertures for directing fluid flowing therethrough.

3. A valve guard and burying device as defined in claim 1 wherein:

said manifold is generally circular in cross-section and is generally rectangular in exterior shape and has at least one adapter integral therewith for connection to a high pressure fluid line.

4. A fluid transmission pipeline segment comprising:

a tubular conduit for transporting fluid therein;

a tap-off valve connected to said tubular conduit and projecting generally normally therefrom;

a closed loop tubular manifold fashioned into a generally elongate rectangular configuration for encompassing said tap-off valve to be buried, including at least one high pressure tap conduit integrally connected into said manifold for connection to a high pressure fluid line, and said tubular manifold having a plurality of apertures at least along both lengths thereof fashioned therein for directing a fluid stream into a bed beneath the valve to flush away a portion of the bed to permit the valve to be buried therein, and means for fixedly connecting said manifold to the pipeline so as to extend longitudinally thereof in fixed surrounding relationship to the valve.

5. A valve burying device as defined in claim 4 and further comprising:

a plurality of nozzles connected into said apertures for directing fluid passing therethrough.

6. A valve burying device as defined in claim 4 wherein:

the apertures in said generally rectangular tubular manifold are fashioned only into the long legs of said manifold.

7. A method for burying a pipeline resting on a bed and having one or more tap-off valves connected thereto comprising:

translating a burying device along a pipeline to remove a portion of the bed the pipeline is resting upon and burying the pipeline therein;

transporting the burying device to beyond a tap-off valve section which may be normally extending from the pipeline without burying the tap-off valve section with the burying device;

connecting a high pressure fluid line to a uniform jet member surrounding the valve;

jetting fluid from the jet member into the bed beneath the valve section of the pipeline to flush away a portion of the bed so that the valve section of the pipeline may be buried in the bed independently of the burying function of the burying device; and continuing to translate the burying device along the pipeline to bury the pipeline in the bed it rests upon.

8. A method for burying a section of a pipeline resting on a bed and having at least one tap-off valve connected thereto comprising:

surrounding the tap-off valve with a jetting manifold having a generally rectangular shape and a plurality of jetting heads downwardly disposed along the long sides thereof;

connecting the jetting manifold to the pipeline section; and jetting a fluid through jetting heads into the bed the pipeline and valve are resting upon to flush a portion of the bed away so as to bury the pipeline section, the valve and the jetting manifold in the bed.

* * * * *